(12) United States Patent
Silvanus et al.

(10) Patent No.: US 10,018,210 B2
(45) Date of Patent: Jul. 10, 2018

(54) COMPONENT HAVING AN INTEGRAL BOND AND JOINING METHOD

(71) Applicant: Airbus Defence and Space GmbH, Ottobrunn (DE)

(72) Inventors: Juergen Silvanus, Unterhaching (DE); Meinhard Meyer, Munich (DE); Michael Juergens, Munich (DE)

(73) Assignee: Airbus Defence and Space GmbH (DE)

( * ) Notice: Subject to any disclaimer, the term of this patent is extended or adjusted under 35 U.S.C. 154(b) by 5 days.

(21) Appl. No.: 14/974,949

(22) Filed: Dec. 18, 2015

(65) Prior Publication Data

US 2016/0177988 A1 Jun. 23, 2016

(30) Foreign Application Priority Data

Dec. 19, 2014 (EP) .................................. 14004303

(51) Int. Cl.
*B29C 70/24* (2006.01)
*B29C 65/34* (2006.01)
(Continued)

(52) U.S. Cl.
CPC .............. *F16B 5/08* (2013.01); *B29C 65/344* (2013.01); *B29C 65/3424* (2013.01);
(Continued)

(58) Field of Classification Search
CPC ........... B23K 33/00; E04B 1/585; H05B 7/14; F04B 53/144; F16D 1/068; F16B 5/08;
(Continued)

(56) References Cited

U.S. PATENT DOCUMENTS 2,914,846 A * 12/1959 Baldus ................... B23K 9/007
228/185
3,431,157 A * 3/1969 Mack .................. B29C 37/0082
156/182
(Continued)

FOREIGN PATENT DOCUMENTS

EP 1941987 A1 7/2008
FR 2742691 A1 6/1997
(Continued)

OTHER PUBLICATIONS

Ahmadi H et al: "Influence of Pin Profile on Quality of Friction Stir Lap Welds in Carbon Fiber Reinforced Polypropylene Composite" International Journal of Mechanics and Applications, Bd.2, Nr.3, Jan. 1, 2012 (Jan. 1, 2012).
(Continued)

*Primary Examiner* — Joshua J Michener
*Assistant Examiner* — Kyle J. Walraed-Sullivan
(74) *Attorney, Agent, or Firm* — Lerner, David, Littenberg, Krumholz & Mentlik, LLP

(57) ABSTRACT

A component includes at least first and second plastics component parts which are interconnected in a connection zone. A reinforcing element includes at least one wire which bridges the connection zone. The first and second plastics component parts are welded together and/or are fused together in the connection zone. The plastics component parts may be bonded to one another.

17 Claims, 2 Drawing Sheets

(51) Int. Cl.
| | |
|---|---|
| *F16B 11/00* | (2006.01) |
| *B29C 70/04* | (2006.01) |
| *F16B 5/08* | (2006.01) |
| *B29C 65/36* | (2006.01) |
| *B29C 65/56* | (2006.01) |
| *B29C 65/00* | (2006.01) |
| *B29C 65/14* | (2006.01) |
| *B29C 65/48* | (2006.01) |
| *B29C 65/72* | (2006.01) |
| *B29C 65/06* | (2006.01) |
| *B29K 101/12* | (2006.01) |
| *B29K 305/00* | (2006.01) |

(52) U.S. Cl.
CPC ...... *B29C 65/3428* (2013.01); *B29C 65/3432* (2013.01); *B29C 65/364* (2013.01); *B29C 65/3624* (2013.01); *B29C 65/3628* (2013.01); *B29C 65/3632* (2013.01); *B29C 65/564* (2013.01); *B29C 66/1122* (2013.01); *B29C 66/30341* (2013.01); *B29C 66/43* (2013.01); *B29C 66/7212* (2013.01); *B29C 66/72141* (2013.01); *B29C 65/06* (2013.01); *B29C 65/1412* (2013.01); *B29C 65/3476* (2013.01); *B29C 65/3676* (2013.01); *B29C 65/48* (2013.01); *B29C 65/72* (2013.01); *B29C 66/71* (2013.01); *B29C 66/72143* (2013.01); *B29C 66/73921* (2013.01); *B29K 2101/12* (2013.01); *B29K 2305/00* (2013.01)

(58) Field of Classification Search
CPC ............ B29C 65/3424; B29C 65/3428; B29C 65/3432; B29C 65/344; B29C 65/3624; B29C 65/3628; B29C 65/3732; B29C 65/364; B29C 65/06; B29C 65/1412; B29C 65/3476; B29C 65/3676; B29C 65/48; B29C 65/72; B29C 65/71; B29C 66/1122; B29C 66/30341; B29C 66/43; B29C 66/7212; B29C 66/72141; B29C 66/72143; B29C 66/73921; B29K 101/12; B29K 2305/00
USPC .................................. 403/266–267, 270–272
See application file for complete search history.

(56) References Cited

U.S. PATENT DOCUMENTS

| | | | | |
|---|---|---|---|---|
| 3,449,199 A * | 6/1969 | Mead | ...................... | B29C 53/32 152/197 |
| 3,895,160 A * | 7/1975 | Seeman, II | ............... | B63B 5/16 156/178 |
| 3,940,524 A * | 2/1976 | Hoppe | .................... | B29C 44/12 264/257 |
| 3,983,282 A * | 9/1976 | Seennann, III | ......... | B29C 70/22 156/180 |
| 4,125,981 A * | 11/1978 | MacLeod | ................ | E04B 1/161 52/309.12 |
| 4,167,953 A * | 9/1979 | Carlstrom | ............... | F16L 9/123 138/133 |
| 4,336,221 A * | 6/1982 | Garabedian | ............. | B29C 33/10 264/122 |
| 4,350,728 A * | 9/1982 | Huang | .................. | B29C 65/564 244/123.1 |
| 4,528,051 A * | 7/1985 | Heinze | .................... | B29C 70/24 156/324 |
| 4,911,683 A * | 3/1990 | Legge | ...................... | F16G 3/02 428/223 |
| 4,954,387 A * | 9/1990 | Sikorski | ............. | B29C 37/0085 428/138 |
| 5,313,034 A * | 5/1994 | Grimm | .................. | B23K 13/02 156/274.2 |
| 5,466,506 A * | 11/1995 | Freitas | .................. | B29C 70/023 428/105 |
| 5,876,540 A * | 3/1999 | Pannell | ................. | B29C 65/344 156/272.4 |
| 6,088,985 A * | 7/2000 | Clark | ...................... | E04C 2/044 52/309.11 |
| 6,426,029 B1 * | 7/2002 | Hiscock | ............. | B28B 19/0046 264/241 |
| 6,517,658 B1 * | 2/2003 | Wageman | ............... | B29C 70/86 156/245 |
| 8,141,606 B2 * | 3/2012 | Benzing, II | ............... | B60B 9/06 152/13 |
| 2002/0109348 A1 * | 8/2002 | Pfeiffer | ................. | B29C 65/342 285/21.2 |
| 2003/0075919 A1 | 4/2003 | Schulte-Ladbeck et al. | | |
| 2004/0057782 A1 * | 3/2004 | Okamoto | ............. | B21K 25/005 403/271 |
| 2004/0185213 A1 * | 9/2004 | Skelton | .................... | E05G 1/024 428/60 |
| 2005/0102968 A1 * | 5/2005 | Long, Sr. | ................. | E04C 2/044 52/782.1 |
| 2005/0186390 A1 * | 8/2005 | Bersuch | ................ | B29C 65/562 428/119 |
| 2005/0230361 A1 * | 10/2005 | Wang | ...................... | B23K 11/06 219/117.1 |
| 2005/0269823 A1 * | 12/2005 | DeVoursney | ........... | B60R 19/18 293/102 |
| 2008/0149276 A1 * | 6/2008 | Sprott | ..................... | B29C 65/72 156/379.7 |
| 2008/0274326 A1 * | 11/2008 | Kim | ........................ | B29C 70/24 428/90 |
| 2010/0159196 A1 * | 6/2010 | Naritomi | ............... | B29C 70/088 428/141 |
| 2012/0276320 A1 * | 11/2012 | Zalewski | ............ | B29C 65/4835 428/61 |
| 2013/0052392 A1 * | 2/2013 | Radlmayr | ............. | B29C 70/688 428/68 |
| 2013/0266793 A1 * | 10/2013 | Robertshaw | ............. | E04B 2/845 428/223 |
| 2013/0287481 A1 | 10/2013 | Hardy | | |
| 2013/0288036 A1 * | 10/2013 | Schulze | ............... | B29C 65/5057 428/223 |
| 2014/0016993 A1 * | 1/2014 | Itoh | ........................ | B32B 37/18 403/270 |
| 2014/0205800 A1 * | 7/2014 | Raghavendran | .... | E04G 23/0218 428/141 |
| 2014/0334868 A1 * | 11/2014 | Apfel | ..................... | B60R 13/00 403/267 |
| 2016/0318239 A1 * | 11/2016 | Silvanus | ............. | B29C 66/1142 |

FOREIGN PATENT DOCUMENTS

| | | |
|---|---|---|
| JP | 04-135720 A | 5/1992 |
| JP | 2003145625 A | 5/2003 |
| JP | 2013-043770 A | 3/2013 |
| WO | 2012140058 A2 | 10/2012 |

OTHER PUBLICATIONS

EP Search Report (dated May 19, 2015) (EP 14 00 4303).
EP Search Report (dated May 26, 2015) (EP 14 00 4302).
U.S. Appl. No. 14/974,867, filed Dec. 18, 2015.

* cited by examiner

View A:

COMPONENT HAVING AN INTEGRAL BOND AND JOINING METHOD

FIELD OF INVENTION

The invention relates to a component comprising at least two interconnected plastics component parts, and to a corresponding joining method.

BACKGROUND OF THE INVENTION

Interconnecting different plastics component parts is a recurring task in various industrial fields of application. Bonding methods and welding methods are preferably used for this. In fibre-reinforced plastic materials, fibre reinforcement is often not provided in the connection region, i.e. in the region of the bonding surface or welding surface. The strength of the fibre-reinforced plastics material is provided by the combination of the matrix plastics material and the fibres embedded therein. Due to the lack of fibres therein, the connection region of a welded component has a reduced load-bearing capacity, in particular tensile strength. In order to reduce this problem, the glue joints are conventionally made larger or additional securing means, such as "chicken rivets", are used. Rivets are referred to as chicken rivets when they are not actually necessary when there is a sufficiently sturdy bond in which the connection strength of a glue joint corresponds to the strength of the base material. "Chicken rivets" are also used to prevent spontaneous, i.e. bad or unpredictable, failure of bonds in general. This failure can also be caused by non-uniform mechanical properties in the thickness direction of composite fibre laminates or composite fibre laminate joints. A composite fibre laminate can in principle be described as a bond between individual fibre layers, i.e. the joint region is not fibre-reinforced; there is at most a slightly thicker (a few μm) resin layer.

WO 2011/069899 A2 discloses a joining method, in which a metal sheet is integrated in the connection zone and protruding portions or anchoring pins grip into the adjacent plastics material on either side in order to create meshing which improves the connection between the bonded or welded surfaces.

BRIEF SUMMARY OF THE INVENTION

One of the ideas of the invention is to provide an improved method for joining plastics components. This is intended to increase the load-bearing capacity of the connection region and as far as possible there should be no weakening of the overall material strength.

A component comprises at least two plastics component parts which are interconnected in a connection zone and the connection zone comprises a reinforcing element which comprises a wire which bridges the connection zone and is in particular bent. The plastics component parts are anchored as a result. Shear forces are consequently effectively absorbed and the plastics component parts are thus reliably interconnected, and optional bonding or welding of the plastics component parts is dispensed with. The anchoring also absorbs peeling forces. Shaping the wire appropriately makes it possible to dispense with a support, such as a metal sheet known from the prior art, which ensures that the individual reinforcing elements are positioned and oriented correctly. In addition, as shown in some of the embodiments, the reinforcing element in the connection zone can be oriented perpendicularly to the connection zone. Indeed, an unbent wire meets these requirements, an undercut still being obtained by a bent wire.

In this case, the reinforcing element may consist of the wire. In particular, it does not comprise an additional support or retaining element, such as a metal sheet on which or to which it is attached.

The wire may be embedded in the plastics component parts. Embedded means, in particular, that the wire cannot be removed in a non-destructive manner. "In a non-destructive manner" may relate to the fact that the component and in particular the plastics component parts thereof are not destroyed. As a result, a zero-backlash connection is created which is interlocking and can thus absorb the forces in the best possible manner.

In particular, the reinforcing elements on the surfaces of the plastics component parts opposite the connection zone do not protrude beyond said plastics component parts and/or are not visible on said component faces. By the wire being embedded in this way, the reinforcing element is protected from environmental influences and a possible surface coating can be formed homogeneously. Since the reinforcing element is not visible on either surface of the component, it follows that the component was produced in the joining method described below. In known tufting methods or stitching methods, a reinforcing element is inserted, specifically from at least one component surface.

The plastics component parts may be welded together and/or fused together in the connection zone. Indeed, a high-quality connection can be achieved by means of the reinforcing elements. In addition, the plastics component parts can be integrally bonded, which significantly increases the strength.

Alternatively, the plastics component parts may be bonded, meaning that, in particular, an additional component part made of the same or another substance is introduced into the connection zone.

The at least one wire in particular comprises a plurality of identical turns and the individual turns have a uniform thickness in the component transverse direction. In addition, a plurality of wires of this type can be arranged next to one another and thus form a planar structure having a uniform thickness. An individual wire can be introduced right at the end (or ends) of the connection zone, at which peeling loads should be expected, and can thus absorb said load in a targeted manner. When a planar structure is introduced, it is sufficient to simply insert said wire. Care does not necessarily have to be taken to ensure a specific orientation. When the turns have a uniform thickness, they penetrate the material on either side to the exact same depth, therefore producing a reproducible strength.

The at least one wire can be bent in the shape of a spiral and have a constant diameter. Therefore, the cross section is circular. In addition, elbows can be provided in the process. The radius of the elbows is preferably an acute bending angle of for example 90°, or at least less than a fifth of the radius of the helical portions having a constant diameter. Other cross sections of the reinforcing elements, such as oval, square, rectangular, triangular, pentagonal or hexagonal are also advantageous. The circular design is particularly preferred since it is simple to produce and, when introduced into the connection zone, an angular orientation does not need to be ensured.

The at least one wire can also comprise turns which are spaced apart, and therefore an elongate structure, in particular a spiral spring, is formed and the individual turns can each be perpendicular to the longitudinal extent of the elongate structure. This is advantageous in particular when two plastics component parts which each comprise fibre reinforcement having the same orientation are intended to be connected. The individual turns can then be oriented along the individual reinforcing fibres. As a result, it is considerably easier to embed the reinforcing elements between the fibres.

At least one of the plastics elements, in particular both plastics elements, advantageously comprises fibres arranged between individual turns or portions of the reinforcing element. In this respect, the viewing direction is preferably transverse to the component thickness direction. By embedding the reinforcing elements between the fibres, direct force transmission from the fibres to the reinforcing elements is promoted. In this case, the fibres are in particular directional fibres which preferably serve to increase the load-bearing capacity of the component in one or more directions.

In a joining method for producing a connection between at least two plastics component parts, a wire-shaped and in particular bent reinforcing element is arranged between the at least two plastics component parts and at least one of the plastics component parts is softened and/or melted by supplying energy, in particular inductive energy, electrical energy or microwave energy so that portions of the reinforcing element embed in the material of the plastics component part and in particular the plastics component parts are integrally bonded to one another.

In the joining method, the reinforcing element can be advantageously heated such that it dissipates thermal energy to the surrounding plastics component parts. The plastics component parts are thus indirectly heated. Since the reinforcing element is arranged in the joint zone, the plastics material is softened or melted precisely where the connection to the other plastics component part is crucial. Damage to the plastics material which may be caused by heating is reduced and/or in the worst case only occurs locally. Electrical energy can also be introduced by an electric current flowing through the wire-shaped reinforcing element and said element being heated by means of its specific resistance. The energy is preferably introduced inductively and/or via microwaves and/or via infrared radiation and/or via friction welding or ultrasonic welding. The integral bond can also be achieved or promoted by means of welding and/or bonding using an added substance. Integral bonds are connections in which the connection partners are held together by atomic or molecular forces. At the same time, they are non-releasable connections which can only be broken by destroying the connection means. Bonding methods can in particular also be included.

Furthermore, the at least one reinforcing element can comprise at least one wire, one fibre or the like, which comprises a plurality of bends and/or elbows such that a three-dimensional structure is formed and in particular a plurality of said reinforcing elements are arranged next to one another. A fibre-reinforced plastics material can also be arranged in the connection zone, the fibre content in particular being higher in said zone than an average fibre content of the plastics component parts.

In addition, the at least two plastics component parts are interconnected by means of an integral bond. This can include welding and bonding. As a result, the connection is promoted by the reinforcing element. In particular, peeling forces acting on the connection can thus be effectively absorbed. The at least one reinforcing element can preferably be internal in the component thickness direction, and therefore there are no reinforcing elements present or protruding in particular on at least one and in particular on both of the outer surfaces of the component. The reinforcing elements are in particular completely internal in the component transverse direction. As a result, the reinforcing element is protected against environmental influences. In alternative embodiments, the reinforcing element can protrude as far as the component surface. This makes it possible to visually check whether the connection is fully joined.

In certain embodiments, the reinforcing element can also comprise a base body, such as a metal sheet, which is arranged in the connection zone of the at least two plastic component parts and a plurality of mandrels, bolts, tongues or ribs are arranged proceeding therefrom. The base body serves as a support for the bends, mandrels, tongues or ribs in this context.

In an additional embodiment, the at least one reinforcing element comprises a plurality of wires, fibres, hooks, pins or the like which comprise a plurality of bends and/or elbows, and therefore a three-dimensional structure is formed and in particular a plurality of said reinforcing elements are arranged next to one another. In this way, an aforementioned metal sheet-like base body in the form of a support for the mandrels, tongues or the like can be dispensed with, since the orientation of the portions embedded in the plastics component parts to be connected can be ensured due to the three-dimensional geometry of the reinforcing element.

The reinforcing element and in particular the turns, mandrels, tongues or ribs thereof, advantageously comprises an undercut, in the direction transverse to the component surface, for the material of the plastic component parts. The turns, mandrels, tongues or ribs are in particular embedded in the material of at least one of the plastics component parts by means of an interlocking connection. As a result, the geometry of the plastics component parts makes the connection possible. In particular lifting forces, which are also referred to as peeling forces, are thus absorbed by the reinforcing element. It is further advantageous for a fibre-reinforced plastics material to be arranged in the connection zone. In particular, the fibre content can be higher in said zone than an average fibre content of the plastics component parts. In particular, short fibres up to 5 mm long are considered in this case. If there is welding in the connection zone, the connection force can be increased in this way. Furthermore, the reinforcing element can comprise a metallic material and/or can be made from an electrically conductive material and/or can have a metal coating. This allows for energy to be transmitted to the reinforcing element by means of induction, the electrical resistance or microwaves such that local material softening is made possible and the plastics component parts as a whole are subjected to as little thermal loading as possible.

BRIEF DESCRIPTION OF THE DRAWINGS

Some embodiments of the invention are described in more detail in the following on the basis of schematic views, in which.

DETAILED DESCRIPTION

Figure 1:
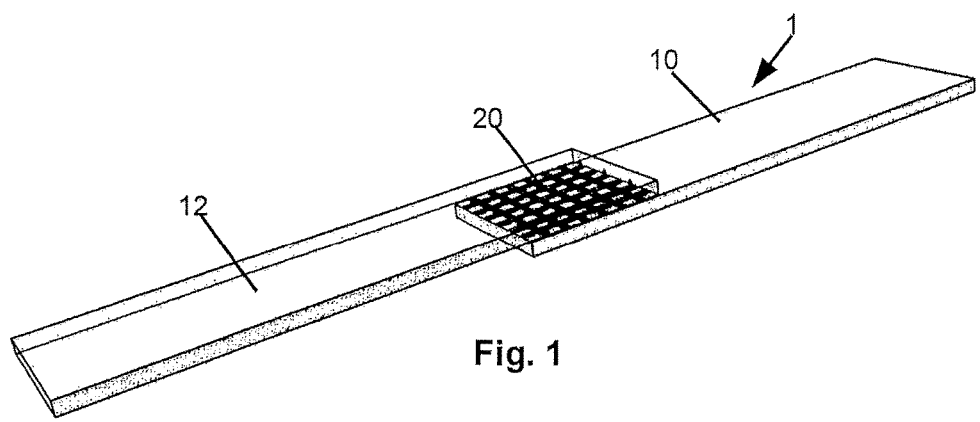
FIG. 1 is a perspective view of two plastics component parts which are connected to form a component.

FIG. 1 shows two plastics component parts 10 and 12 of a component 1. The component 1 can be a component used in aviation. It can thus be in particular a flap, such as a landing flap, of an aircraft. In the preferred embodiment, the components consist of a thermoplastic and are fibre-reinforced. The fibre reinforcement can be designed differently. In a first variant, the fibres are long and directional so that a certain orientation, which corresponds in particular to the main loading direction, is determined for the fibres structurally. In a second variant, a plurality of short fibres are randomly distributed in the resin so that the general loading strength of the component is increased, without a preferred orientation of the fibres being specified within the material. Combinations of these fibre orientations are also possible.

Figure 2:
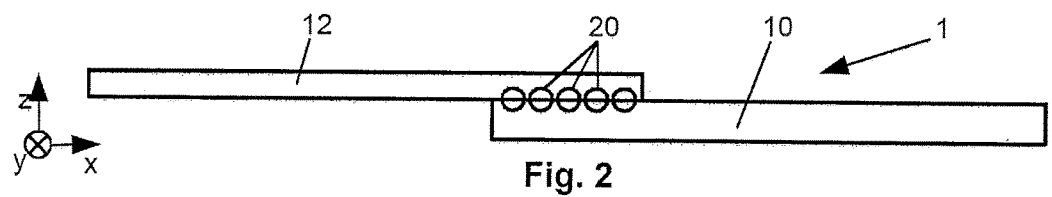
FIG. 2 is a side view of the component shown in FIG. 1.

FIG. 2 is a side section through the component 1 according to FIG. 1. A plurality of helical reinforcing elements 20 can be seen, and so, in section, the circular cross section shown is produced in each case.

The fibres contained in the plastics component parts 10 and 12 are not shown in this case. In a preferred embodiment, a plurality of glass fibres or carbon fibres are oriented in the x-direction in each of the plastics component parts 10 and 12. These fibres are used to increase the tensile strength of the component 1 in the x-direction. If no reinforcing element 20 was integrated in the connection zone, the glue joint in the connection zone would have to completely absorb the tensile forces and carry them away from one of the plastics component parts to the other. Since it is possible for no fibres or an insufficient number of fibres to be contained in the connection zone, the connection strength of the connection zone is less than the (tensile) strength of the overall material.

Figure 3:
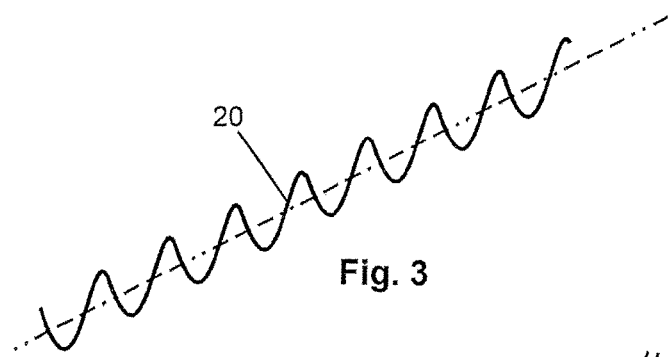
FIG. 3 is a side view of a helical reinforcing element.
Figure 4:
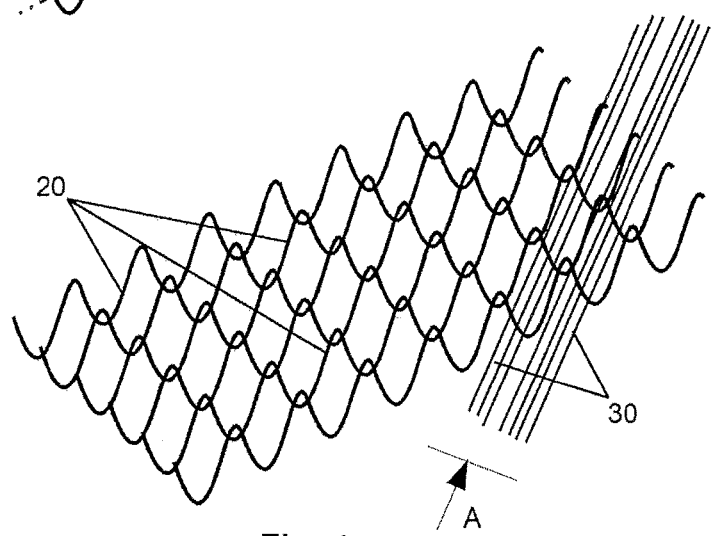
FIG. 4 shows a mat-like structure having a plurality of helical reinforcing elements.

The reinforcing element 20 is used to increase the connection strength, as shown by way of example in FIGS. 3 and 4. FIG. 3 shows a helical wire. In the embodiment according to FIG. 2, five of these wires are integrated in parallel with one another in the connection zone.

Figure 5:
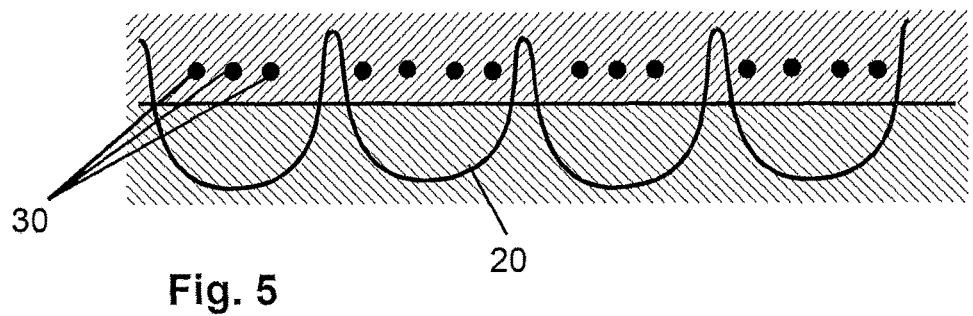
FIG. 5 is a section through two connected plastics component parts, a mat according to FIG. 4 being used and the view A according to FIG. 4 being shown.

FIG. 4 shows a reinforcing element 20 which is formed from a plurality of connected helical wires shown in FIG. 3. These wires can be interwoven in the form of a mat. Individual helical elements can also be soldered or welded together in order to form a planar, three-dimensional structure. In addition, a pair of embedded fibres 30 are shown by way of example. FIG. 5 is a section A at an oblique angle through said structure, the surrounding resin not being shown. In the section, the turns of the reinforcing element are cut at a very flat angle such that a free portion is formed in the z-direction (see FIG. 2). The orientation shown of the bent wires makes it possible for the turns thereof of the reinforcing element 20 to penetrate the material between the fibres 30 during the joining process, without significantly displacing the fibres 30.

Figure 6:
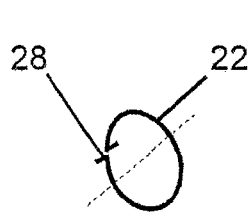
FIG. 6 shows an individual turn of an alternative embodiment of the reinforcing element.
Figure 7:
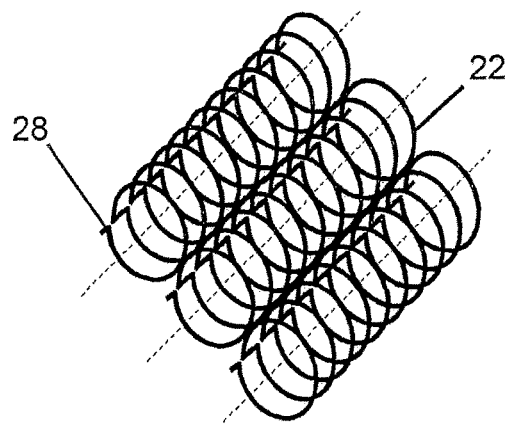
FIG. 7 shows a plurality of the reinforcing elements shown in FIG. 6 in a mat-shaped arrangement.
Figure 8:
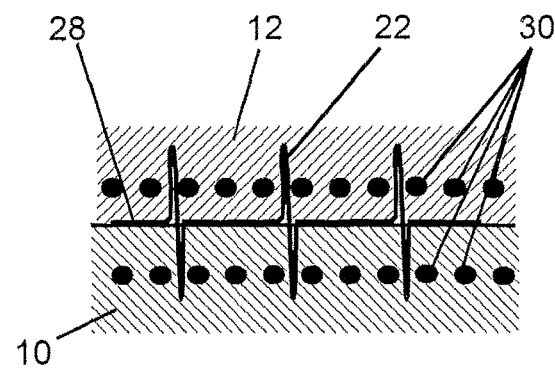
FIG. 8 is a side section through a component having the reinforcing elements according to either FIG. 6 or FIG. 7.

An alternative embodiment of the reinforcing elements is shown in FIGS. 6 to 8. In these figures, a reinforcing element 22 consisting of wire is bent into the shape of a spiral so that the individual turns each have the same diameter. The individual turns are perpendicular to the longitudinal axis of the spirals thus produced. Elbows 28 are predetermined between the individual turns, the length of which elbows defines the distance between the individual turns. While an individual turn is shown in FIG. 6, FIG. 7 shows a planar structure made up of a plurality of turns, the individual spirals thus produced being interconnected. Alternatively, the individual spirals can also be introduced into the connection zone individually. As shown in FIG. 8, the elbows are preferably precisely in the contact or connection zone of the two plastics component parts 10, 12 and the turns are embedded in the plastics material thereof. The bend in this embodiment can be compared with a spiral binding, as is used when binding sheets.

A thermoplastic is used, in the form of a matrix material, as the material for the plastics component parts 10, 12. PEEK can preferably be used.

In the method for joining the plastics component parts 10, 12, the reinforcing element 20, 22 is first arranged between the plastics component parts 10 and 12. The reinforcing element 20 can then be brought to the softening point of the thermoplastic of the component parts 10, 12. By means of a pressure in the z-direction, the turns of the reinforcing element penetrate the plastics component parts 10, 12. An induction heat source may be used to allow for or to promote the penetration of the turns. The reinforcing element 20 is preferably made of a suitable (metal) material for this purpose. In particular steel or titanium are possible in this case. The reinforcing element should also be sufficiently strong that it can promote the connection between the plastics component parts by means of tensile forces, inter alia. Since, in this way, the reinforcing element can be heated both locally and selectively, the plastics component parts 10, 12 are subjected to as little thermal load as possible. The plastics material can also be softened by means of other heat sources, such as infrared or lasers.

The rigidity of the reinforcing element, i.e. in particular of the bent wire, is so high that during the joining process, only or almost only elastic deformation occurs. If the reinforcing element is used bent in the shape of a circle, said circular shape is thus still present in the finished connected component. During the joining process, the reinforcing element therefore barely deforms.

Alternatively, an electric current can be applied in order to inductively heat the ends of the wires of the connecting elements, for example, so that the plastics materials is heated, softened and optionally melted by means of ohmic heating.

In an alternative configuration of the joining process, both the plastics component parts to be connected are arranged such that they overlap. The plastics material is then heated in order to reduce its strength. A helical reinforcing element is then twisted into the plastics material from an outer side. In this way, it is possible to achieve a form of interweaving of the reinforcing element and the fibres embedded in the plastics material. The reinforcing element is preferably screwed in at an acute angle of for example 30°+/−15° to the component surface in order to thus create "interweaving" by means of a plurality of turns of the reinforcing element.

A force is applied to the plastics component parts 10, 12 in the z-direction in order to produce the connection. As a result, the turns of the reinforcing elements are pressed into the plastics material or the plastics material flows around the turns. When the plastics component parts 10, 12 touch, the joining process is complete. As a result of the plastics material flowing around the turns, the formerly flat surface of the plastics component parts 10, 12 is broken up. As a result, the surface area is enlarged, which promotes the connection between the plastics component parts 10, 12. As a result of said connection, the turns of the reinforcing elements are embedded in the plastics material. The turns of the plastics material are integrally bonded to the particular reinforcing element, which is embedded in both plastics component parts. Since the load-bearing capacity of the reinforcing element, which is made from stainless steel for example, is significantly higher than that of the plastics component parts, the connection strength is correspondingly increased.

Typical loads on the connection include shearing forces, i.e. tensile forces or pressure forces in the x-direction according to FIG. 2, or peeling forces perpendicular thereto. In particular, the loading capacity in terms of peeling forces is significantly increased by the above-described connection.

A filler substance, which is preferably a thermoplastic having a high fibre content, can also be introduced between the two plastics component parts 10, 12. When the material is melted by means of a friction stir method, improved welding of the plastics component parts can be achieved by the filler substance.

If the thickness of the plastics component parts is 10 mm, for example, turns having a diameter of for example from 6 to 8 mm can be used, so that the turns press into the material by approximately 3-4 mm. In general, the embed depth of the turns of the wire is preferably between 0.2 and 0.7 times the thickness of the particular plastics component part.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A component comprising:
   at least first and second plastics component parts interconnected in a connection zone such that the first and second plastics component parts overlap in the connection zone; and
   a reinforcing element comprising at least one wire extending through the connection zone and embedded at least partially in the first and second plastics component parts in the connection zone,
   wherein the at least one wire comprises a plurality of connected helical wires interwoven in the form of a mat, and
   wherein the at least one wire on surfaces of the first and second plastics component parts opposite the connection zone does not protrude beyond said first and second plastics component parts and/or is not visible on said surfaces.

2. The component according to claim 1, wherein the first and second plastics component parts are welded together and/or are fused together in the connection zone.

3. The component according to claim 1, wherein the first and second plastics component parts are bonded to one another.

4. The component according to claim 1, wherein the at least one wire comprises a plurality of identical turns and individual turns have a uniform thickness in a component transverse direction, wherein the plurality of wires are arranged next to one another and form a planar structure having a uniform thickness.

5. The component according to claim 1, wherein at least one of the first and second plastics component parts comprises fibres arranged between individual turns or portions of the reinforcing element, the fibres being directional fibres serving to increase a load-bearing capacity of the component in one or more directions.

6. A joining method for producing a connection between at least two plastics component parts, the method comprising:
   arranging a wire-shaped reinforcing element between the at least first and second plastics component parts interconnected in a connection zone such that the first and second plastics component parts overlap in the connection zone; and
   softening and/or melting at least one of the first and second components by supplying energy so that portions of the reinforcing element embedded in the material of the component are integrally bonded to one another,
   wherein the wire-shaped reinforcing element extends through the connection zone and is embedded at least partially in the first and second plastics component parts in the connection zone,
   wherein the wire-shaped reinforcing element on surfaces of the first and second plastics component parts opposite the connection zone does not protrude beyond said first and second plastics component parts and/or is not visible on said surfaces, and
   wherein the at least one wire comprises a plurality of connected helical wires interwoven in the form of a mat.

7. The joining method according to claim 6, wherein the reinforcing element is heated such that the reinforcing element dissipates thermal energy to the surrounding plastics component parts.

8. The component according to claim 1, wherein the reinforcing element is bent.

9. The component according to claim 5, wherein both the first and second plastics component parts comprise fibres arranged between individual turns or portions of the reinforcing element.

10. The component according to claim 5, wherein the fibres are directional fibres.

11. The component according to claim 9, wherein the fibres are directional fibres.

12. The component according to claim 10, wherein the directional fibres serve to increase the load-bearing capacity of the component in one or more directions.

13. The component according to claim 11, wherein the directional fibres serve to increase the load-bearing capacity of the component in one or more directions.

14. The joining method according to claim 6, wherein the reinforcing element is bent.

15. The joining method according to claim 6, wherein portions of the reinforcing element embedded in the plastics component parts are integrally bonded to one another.

16. The joining method according to claim 6, wherein supplying energy comprises supplying inductive energy, electrical energy or microwave energy.

17. A component, comprising:
   at least first and second plastics component parts interconnected in a connection zone such that the first and second plastics component parts overlap in the connection zone; and a reinforcing element comprising at least one wire bridging extending through the connection zone and embedded at least partially in the first and second plastics component parts in the connection zone, wherein the at least one wire comprises a plurality of connected helical wires interwoven in the form of a mat, wherein the component is a component of a flap of an aircraft.

* * * * *